United States Patent [19]

Bennington

[11] Patent Number: 5,009,598
[45] Date of Patent: Apr. 23, 1991

[54] FLIGHT SIMULATOR APPARATUS USING AN INOPERATIVE AIRCRAFT

[76] Inventor: Thomas E. Bennington, Box 2392, Palm Beach, Fla. 33480

[21] Appl. No.: 274,838

[22] Filed: Nov. 23, 1988

[51] Int. Cl.⁵ .............................................. G09B 9/08
[52] U.S. Cl. ........................................ 434/30; 434/35; 434/38; 434/45; 434/48; 272/1 C; 244/194
[58] Field of Search ..................... 434/30, 35, 38, 43, 434/44, 45, 46, 51, 55, 58, 29, 31, 47, 65, 66, 67, 258, 33; 272/1 C; 244/194, 195, 197, 1 R; 200/573; 364/578

[56] References Cited

U.S. PATENT DOCUMENTS

| | | | |
|---|---|---|---|
| 3,299,197 | 1/1967 | Cutler | 434/31 |
| 3,513,246 | 4/1967 | Fisch et al. | 434/55 |
| 3,546,350 | 12/1978 | Reynolds | 434/35 |
| 3,826,864 | 7/1974 | Paufve | 434/43 |
| 3,885,325 | 5/1975 | Siboti | 434/51 |
| 3,886,334 | 5/1975 | Cummings et al. | 434/30 |
| 4,109,886 | 8/1978 | Tribken et al. | 244/196 |
| 4,214,381 | 7/1980 | Clarke et al. | 434/67 |
| 4,500,868 | 2/1985 | Tokitsu et al. | 434/65 |
| 4,642,774 | 2/1987 | Centala et al. | 244/197 |
| 4,673,356 | 6/1987 | Schmidt | 434/49 |
| 4,781,594 | 11/1988 | Metcalf | 434/48 |

OTHER PUBLICATIONS

"747SP Mockups Shown", Aviation Week and Space Technology, Mar. 4, 1974, p. 28.
"In Flight Simulation Capabilities Tested", Aviation Week and Space Technology, Aug. 9, 1971 (p. 35).

*Primary Examiner*—Edward M. Coven
*Assistant Examiner*—Dean Small
*Attorney, Agent, or Firm*—Richard C. Litman

[57] ABSTRACT

An aircraft flight simulator system adaptable to an actual inoperative aircraft not in flight provides instrument displays driven by a computer flight simulator program interacting with inputs from sensors attached to the actual aircraft control system and overlay switches. The computer may also drive visual displays placed in the cockpit windshield and side windows, as well as provide audio output and output for the operation of aircraft jacks to simulate inflight motion. All equipment may be relatively quickly and easily installed or removed so as to make maximum use of an otherwise inoperative aircraft on the ground, and by the use of computer program modifications, may be used to simulate a wide variety of aircraft. Realistic control handling is provided by feedback mechanisms attached to various aircraft control surfaces and the control column and which are coupled to the computer.

13 Claims, 4 Drawing Sheets

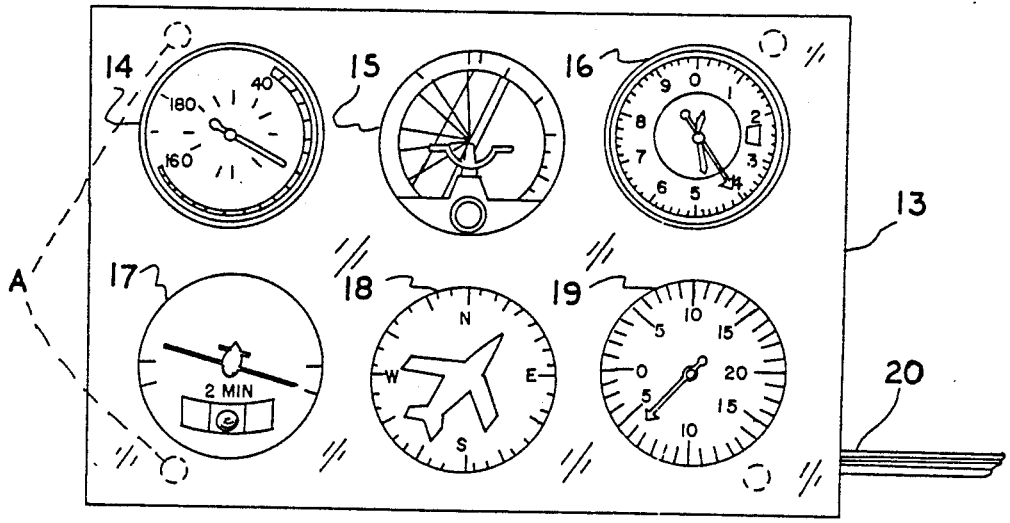
FIG. 3
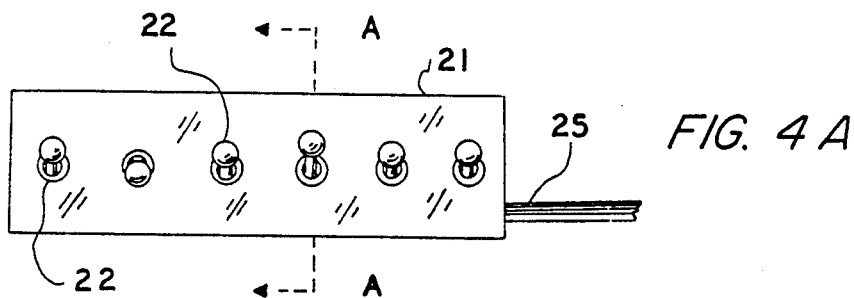
FIG. 4A
FIG. 4B
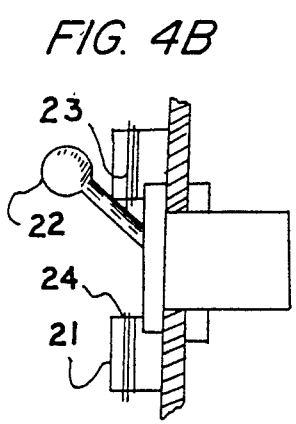
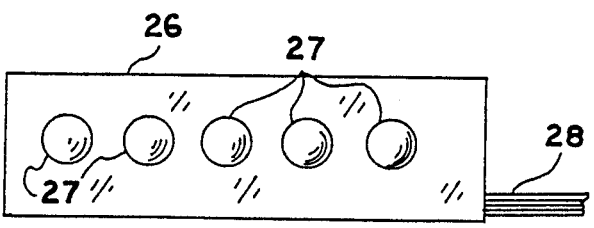
FIG. 5

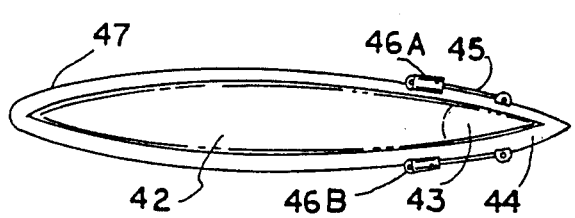
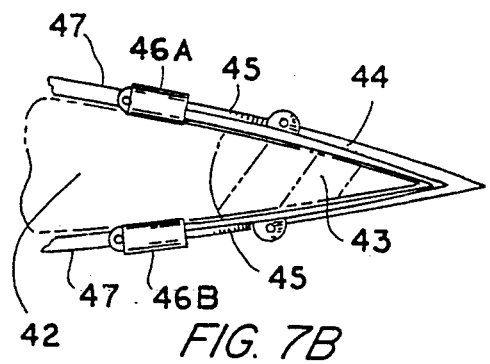
FIG. 7A
FIG. 7B
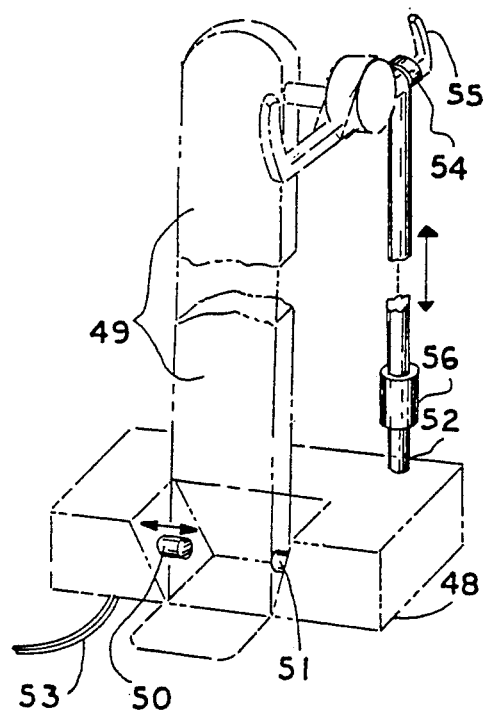
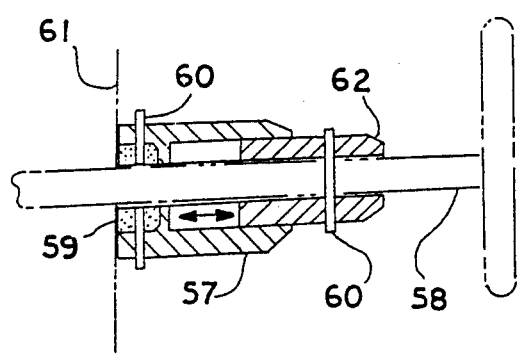
FIG. 7C
FIG. 7D
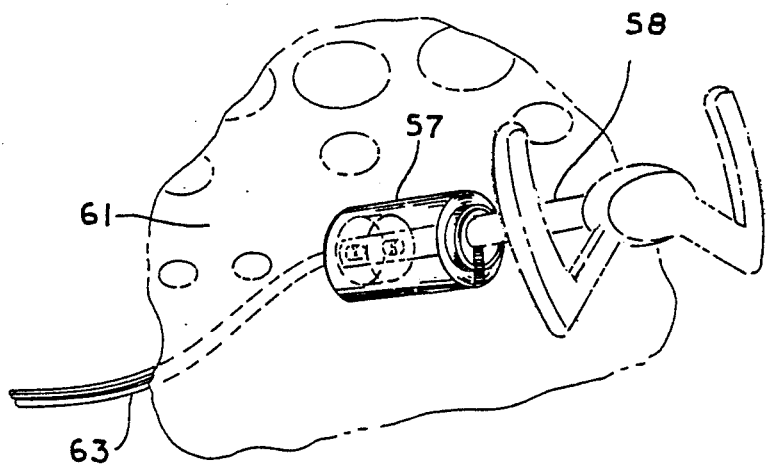
FIG. 7E

FLIGHT SIMULATOR APPARATUS USING AN INOPERATIVE AIRCRAFT

FIELD OF THE INVENTION

The present invention relates generally to the field of flight simulator devices for training pilots and flight crewmembers, and specifically to an apparatus allowing an actual aircraft not in flight to be used as a flight simulator, particularly for simulated instrument flight conditions.

BACKGROUND OF THE INVENTION

It has long been recognized that some means of simulating aircraft flight in a device remaining on the ground may have many benefits in the training of pilots and other flight crewmembers. One of the primary difficulties in constructing such a grounded flight simulator is providing sufficient realism to produce a worthwhile flight training experience for those personnel using such a device, while at the same time keeping the initial and operating costs sufficiently low so as to provide a more economical training means than that of using an actual aircraft.

Grounded flight simulator devices are well known to those involved in the art. Initially simulators were produced using actual aircraft instruments. As these instruments are generally vacuum or electrically powered mechanical devices, such a simulator requires a very complex pneumatic and mechanical system in order to operate properly. Many, if not most, such simulators require more man-hours of time for maintenance and repair than the time they are actually engaged in flight training, even for the simplest simulator for a generic single engine airplane. As the cost of such specialized technical equipment has increased over the years, in some cases actual flight in the aircraft is more economical than flight simulator time.

As technology has advanced, digital electronics have generally replaced many of the older mechanical, electrical, and pneumatic systems previously used. Such newer simulators are far more versatile and realistic than those using older systems, but are nevertheless comparatively costly due to the small number in use, the generally complex systems simulated, and the requirement that a complete enclosure be built to most realistically simulate the aircraft cockpit. If motion is desired in order to add even more realism to the training experience, additional cost is incurred. Meanwhile, the actual aircraft may be temporarily inoperative due to maintenance, scheduling, or other reasons, but cannot be used as its systems are only operative and responsive in the actual flight environment. The present invention provides a means of simulating inflight instrument and/or other responses while using an actual aircraft not in flight in order to provide a realistic training atmosphere while gaining maximum economy by precluding the need for a separate simulated aircraft structure and controls.

DESCRIPTION OF THE RELATED ART

Hunt U.S. Pat. No. 3,363,331 discloses the use of digital electronics in a flight simulator, thereby allowing far easier programming of such simulators in order to more readily and accurately duplicate the characteristics of individual aircraft types. While the present invention makes use of such technology, no provision is made in the Hunt patent for application of that technology to the simulation of flight in an actual aircraft not in flight.

Other patents are known which disclose methods of providing flight training in an actual aircraft which would not otherwise be available. Reynolds U.S. Pat. No. 3,546,350 and Parker U.S. Pat. No. 4,490,117 are examples. In each case, however, the devices disclosed in the patents provide simulation of only a portion of the instrumentation normally used in instrument flight; the actual aircraft must be flown to provide the remainder of the sensations and experiences so important to flight training. As a result, such training is relatively costly, obviously equaling or exceeding the costs involved in standard flight training. Such costs rapidly become prohibitive in the case of larger and/or more complex aircraft.

SUMMARY OF THE INVENTION

By the present invention, an improved system of simulated flight instruction is provided wherein an actual aircraft not in flight is utilized.

Accordingly, one of the objects of the present invention is to provide a realistic ground based training environment by using an actual aircraft not in flight in combination with interactive instrument overlays and control and switch position sensors, thereby allowing the actual controls and switches of the actual aircraft to be used.

Another object of the present invention is to provide a means of producing flight control pressure feedback for the person using the apparatus.

It is an additional object of the present invention to provide for movement of the inoperative aircraft in order to more realistically simulate the flight environment by means of interactive jacks or other lifting apparatus using the standard jacking points on the aircraft.

It is a further object of the present invention to provide simulated visual effects by means of interactive overlays positioned immediately within or without the windshield and/or cockpit side windows of an actual aircraft not in flight.

Still another object of the present invention is to provide for audio effects by means of computer audio output to standard aviation headphones or aircraft cabin speaker.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 3 is a front elevation of the overlay required for a standard aircraft flight instrument panel.

FIG. 4A is a front elevation of a typical switch panel overlay.

FIG. 4B is a cross sectional view, taken along the line A—A of FIG. 4A.

FIG. 5 is a front elevation of an annunciator light panel display.

FIG. 7A is a cross sectional view of a means of providing control pressure feedback.

FIG. 7B is a fragmented sectional view of the details of FIG. 7A.

FIG. 7C is a perspective view of an alternative means of accomplishing control pressure feedback.

FIG. 7D is a vertical cross sectional view of a control pressure feedback device in an alternate embodiment for a different control system.

FIG. 7E is a perspective view of the device of FIG. 7D.

Similar reference characters designate corresponding parts throughout the several figures of the drawings.

DESCRIPTION OF THE PREFERRED EMBODIMENT

Figure 1:
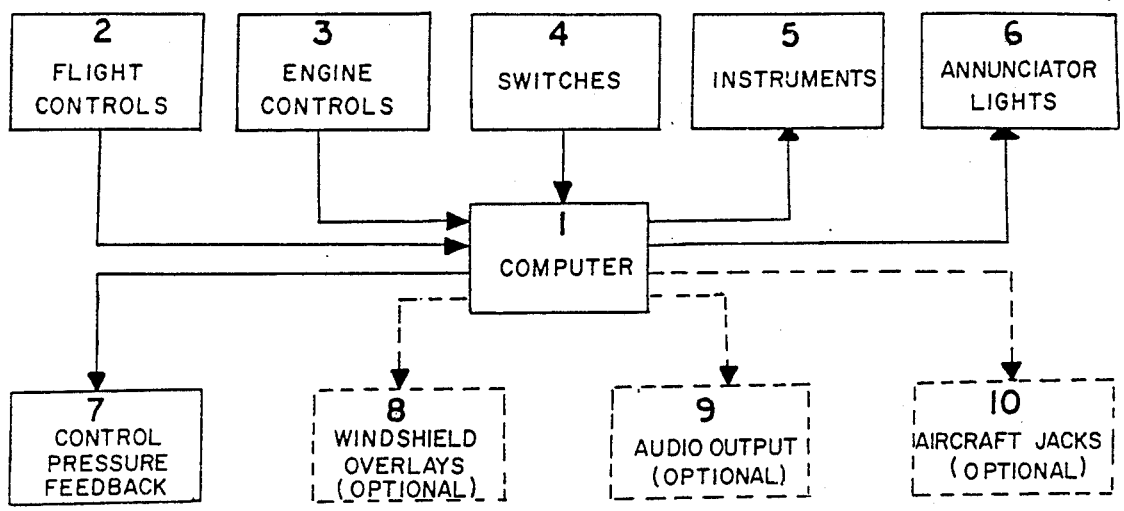
FIG. 1 is a block diagram of the operating system.

Referring now to the drawings, the present invention will be understood to relate to a means of providing a realistic simulation of flight through the use of a portable digital computer which is interfaced with displays and simulations of various aircraft systems temporarily installed in an actual aircraft not in flight. A block diagram of the simulator system is shown in FIG. 1. In this system a portable digital computer 1 receives input from devices detecting movement of aircraft flight controls 2, aircraft engine controls 3, and other switches 4. Computer 1 may process the information received by means of a program similar to many such programs currently available for personal computers. Such computers and flight simulation programs are well known and are not included as claims of the present invention except as used as a component of the system comprising the invention.

In the preferred embodiment, power for computer 1 and all other systems relating to the simulator system is supplied by a source other than the aircraft power supply. In this manner all aircraft switches may be operated without activating the actual systems themselves as the aircraft battery or batteries will not be discharged, and aircraft components which may have a limited permissible operating time between overhaul or replacement will not be activated, thus retaining such limited time as there may be for actual flight time.

As computer 1 receives the above inputs, it processes the inputs according to the program being used and operates overlays for various flight, engine and/or other instruments 5, annunciator and indicator lights 6, and devices to provide control pressure feedback 7. Other output to operate visual, audio, or tactile systems may be added depending upon the degree of realism desired for the particular training period and/or the time available for equipping the actual aircraft used and the time that the aircraft will be available for such use. These optional systems may include a visual display 8 which may be constructed in a manner similar to that of instrument overlay 13 and placed over or immediately within one or more windshield or cockpit windows of the aircraft for the purpose of simulating visual flight conditions. Another optional system may include an audio output 9 for flight crew headphones and/or cabin speaker, which may be controlled by input to the computer from the engine control devices 3 and/or the simulated airspeed of the aircraft, as well as other audio effects.

Figure 2:
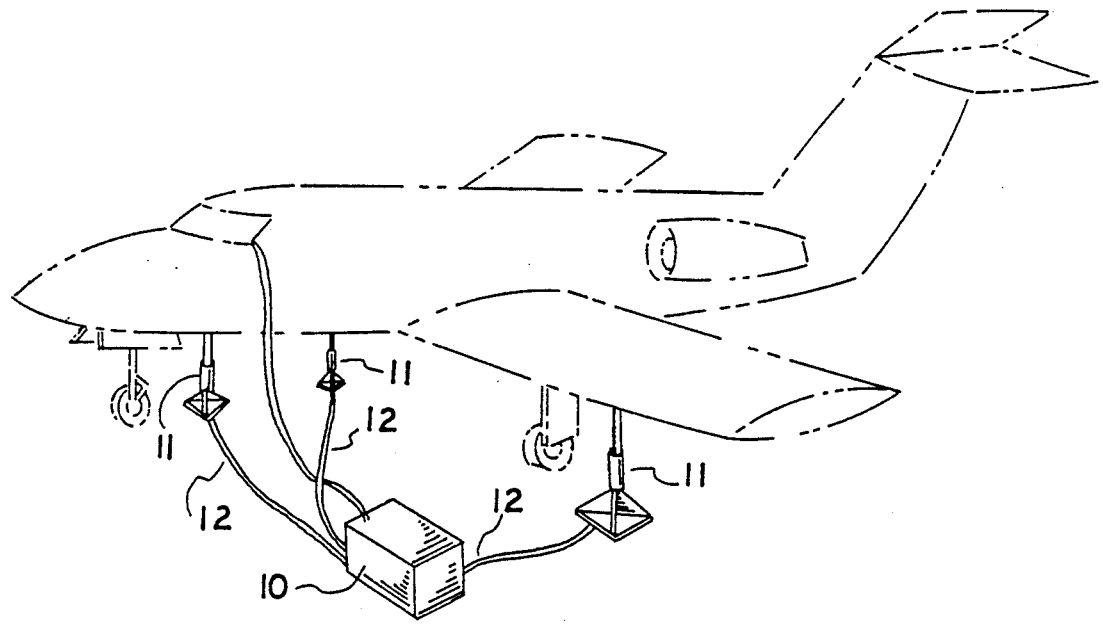
FIG. 2 is a perspective view of an aircraft ready for use as a flight simulator, placed on hydraulic jacks.

Many grounded flight simulators also provide for physical movement of the simulator. This may be done on the actual aircraft by installing standard aircraft jacks 11 or the equivalent as shown in FIG. 2 beneath the approved aircraft lift points. These jacks 11 are normally hydraulically actuated, particularly as used on larger aircraft and the output from computer 1 in FIG. 1 may be used to actuate a unit or units 10 providing hydraulic pressure to the jacks 11 through lines 12 in order to provide aircraft pitch and roll sensations. Other systems may of course be used, such as individual hydraulic control units at each lift point, electric means, etc.

An overlay 13 representative of a typical aircraft flight instrument panel is shown in FIG. 3. This overlay 13 is preferably constructed in a manner much like that used in many personal computer flat video screens, using a liquid crystal display (LCD). The actual construction of such devices is well known and is not claimed except as applied to the present invention. The typical aircraft flight instrument panel consists of an airspeed indicator 14, attitude indicator 15, altimeter 16, turn and slip indicator 17, directional gyro 18, and vertical speed indicator 19. These instruments 14 through 19 comprise what are normally considered to be the basic flight instruments in the typical aircraft. The instruments comprising this or any other overlay may obviously be constructed in a size equal to that of individual aircraft instruments or as a grouping of instruments as shown. The instrument overlay 13 or the individual overlays 14–19 are driven by output from computer 1 in FIG. 1 by means of wiring harness 20 so as to simulate actual aircraft instrument representations in flight. Other instrument overlays, not shown, representing aircraft navigational, engine, and/or other instruments are constructed and operated in a similar manner to that of the overlay 13 containing basic flight instrument representations 14–19. Such overlays may be retained in position by attachment means A such as suction cups, VELCRO attachment, or other suitable means, affixed to the actual aircraft instrument faces, or merely suspended from protrusions formed by instrument post lights or the like.

A typical switch overlay 21 is shown in FIG. 4A. The typical aircraft switch 22 is a two or perhaps three position toggle switch, and the switch overlay 21 provides a means of detecting the position of any switch 22 contained within the overlay 21. This may be accomplished as shown in FIG. 4B, in which the position of a switch 22 is detected by switch position sensors 23 and 24 encased within overlay 21. Such switch position sensors 23 and 24 may consist of microswitches or other sensing means. One of the switch position sensors 23 and 24 will be closed depending upon the position of toggle switch 22, or if toggle switch 22 is a three way switch with a central position, neither of the switch position sensors 23 and 24 will be closed. The actuation of switch position sensors 23 and 24 is then transmitted to computer 1 in FIG. 1 by means of wiring harness 25. Light detecting devices may also be used in place of microswitches as switch position sensors 23 and 24. Such light detecting devices may operate by detecting the difference in light falling upon them depending upon the position of switch 22, as switch 22 blocks the light available to sensor 23 or 24, depending upon the position of switch 22.

FIG. 5 of the drawings discloses an overlay 26 to simulate the illumination of various annunciator lights 27. Such lights 27 contained within overlay 26 may consist of light emitting diodes (LEDs), LCD, incandescent bulbs, or other means, and are activated by output from computer 1 of FIG. 1 by means of wiring harness 28.

Figure 6A:
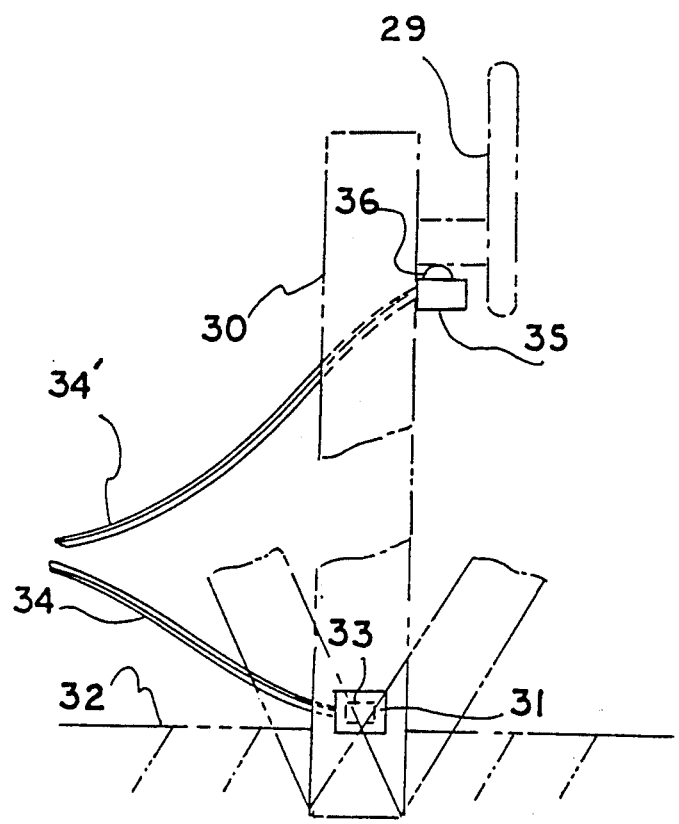
FIG. 6A is a side view of an embodiment of a control column position sensing system.

A typical aircraft control column 30 is shown in FIG. 6A. In such a column 30, control yoke 29 rotates at the top of column 30 to provide roll control for the aircraft. Pitch control is provided by fore and aft movement of the entire column 30. In the preferred embodiment, a roller rheostat 31 or equivalent is temporarily affixed to the aircraft floor 32 so as to bear against the side of the base of column 30. As column 30 is moved fore and aft, roller 33 alters the resistance of rheostat 31, which transmits an appropriate signal by means of wiring harness 34 to computer 1 of FIG. 1, which processes the signal and transmits the appropriate output to instrument overlay 13 of FIG. 3 and/or other instruments as appropriate. Roll input is detected in a similar manner by means of roller rheostat 35 which is affixed near the top of control column 30 so as to bear against the rotary shaft to which control yoke 29 is attached. As control yoke 29 is rotated, roller 36 is actuated which causes rheostat 35 to deliver appropriate input to computer 1 of FIG. 1 through wiring harness 34' in a like manner to that of roller rheostat 31.

Rudder pedals, brake mechanisms, spoilers, and other devices, not shown, obviously may be equipped with like or equivalent means to that of control column 30 so as to provide input to computer 1 of FIG. 1.

Figure 6B:
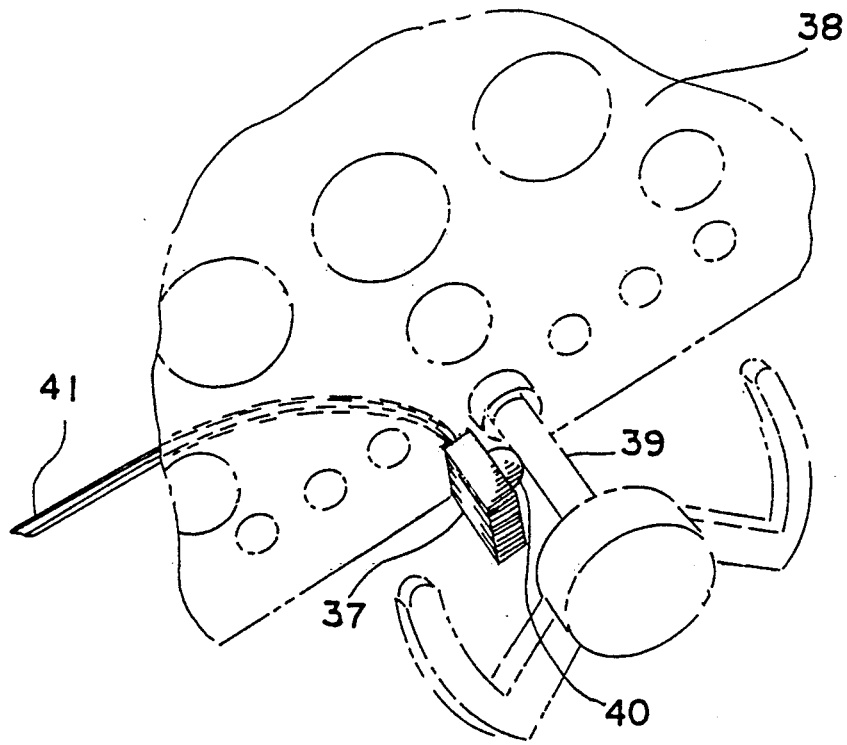
FIG. 6B is a perspective view of an alternate embodiment of a control column sensing system.

An alternate means of detecting flight control position is disclosed in FIG. 6B. A two dimensional position sensing device 37 similar to a personal computer "mouse" or the like is secured to the instrument panel 38 and positioned to detect the movement of control column 39. As control column 39 is actuated, the spherical element 40 is rotated and the resulting signal transmitted to computer 1 of FIG. 1 by means of wiring harness 41. As control column 39 may be actuated axially or in a rotary motion, sensing device 37 will detect motion in either direction or combinations of possible directions as spherical element 40 bears against and is rotated by control column 39. In this manner, control actuation representing pitch and roll input may be transmitted to computer 1 of FIG. 1 and processed to provide signals to drive representations of flight instruments 14–19 within overlay 13 in FIG. 3 or other instrument representations as appropriate.

In order to provide additional value to the flight training experience, it is necessary to simulate the natural pressures produced by the flight controls in flight. This may be accomplished by means of feedback developing devices 44–47 externally attached to the aircraft flight controls 43 as shown in FIG. 7A and 7B, or by devices 48–60 attached to the aircraft controls in the cockpit as shown in FIGS. 7C, 7D and 7E.

A typical aircraft flying surface 42 with flight control surface 43 is shown in FIG. 7A and in an enlarged manner in FIG. 7B. A V-shaped element 44 is installed over flight control surface 43 in the manner of a typical flight control lock. Element 44 is connected to driveshafts 45 which are driven by electrical or hydraulic motors 46A and 46B in order to provide pressure on the flight control surface 43 which may then be experienced by a crewmember handling the controls in the cockpit. Motors 46A and 46B are controlled by computer 1 of FIG. 1 by means of appropriate programming known in the art. Motors 46A and 46B are secured in position on flying surface 42 by means of a strap 47 which extends forward from one motor 46A around the leading edge of flying surface 42 and back to the other motor 46B on the opposite side of flying surface 42. In this manner realistic pressures of normal flying maneuvers, stall buffet, or other pressures may be simulated by commands from computer 1 to actuate motors 46A and 46B and thereby operate the flight control surface 43. This system may of course be used on any flying surface and flight control, be it wings and ailerons, stabilizer and elevator, vertical fin and rudder, or other nonstandard flight control arrangement.

An alternate method of providing control pressure feedback is disclosed in FIGS. 7C, 7D and 7E, in which means of providing the control pressure feedback are installed in the aircraft cockpit. Many large aircraft are equipped with control columns 49 much like that of FIG. 7C. The control pressure feedback mechanism for such a column 49 consists of a control standard 48 which is open on one side so as to be simply installed at the base of control column 49. Control pressure feedback mechanism 48 contains a forward piston 50, an aft piston 51, and an upper piston 52, which may be electrically or hydraulically operated and are controlled by output from computer 1 of FIG. 1 through wiring harness 53. Forward piston 50 and aft piston 51 produce differential pressures against the base of control column 49, thus causing fore and aft movement of the column 49 and requiring counterpressure from a crewmember using the simulator in order to contain the movement, much as in an actual aircraft in flight.

Vertical piston 52 operates in a similar manner, but is connected through a coupling 54 at its uppermost end to control yoke 55 in order to impart rotary motion to the control yoke 55 positioned atop control column 49. In a like manner to the counter pressure required in order to prevent fore and aft movement of control column 49, counterpressure must be applied to control yoke 55 in order to prevent its movement, thus simulating inflight control pressures. Vertical piston 52 may be connected to control yoke 55 utilizing a flexible coupling 56 near its lower end, so as to allow fore and aft movement of control column 49. Similar devices may be affixed to other controls such as rudder pedals, not shown, to produce realistic control pressure feedback for such controls.

A further embodiment of the system is shown in FIG. 7D and 7E, which may be applicable to smaller aircraft. In this embodiment, a control pressure feedback mechanism 57 is connected to control column 58 by means of the standard aircraft control lock collar 59 installed in many smaller aircraft. In this type of system, provision is made for a pin 60 to pass through both the control lock collar 59, which is permanently affixed to the instrument panel 61 of the aircraft, and the control column 58, thereby preventing potentially damaging control movement due to gusty winds, etc. while the aircraft is parked outdoors. By utilizing the provision for a control lock pin, mechanism 57 may be installed on the control lock collar 59 and control column 58 with pins 60. Mechanism 57 operates by producing both axial and rotary motion to collar portion 62 which is secured to control column 58, thereby requiring realistic control counterpressures to be provided by a crewmember. Mechanism 57 may be powered either electrically or hydraulically, and receives its input from computer 1 of FIG. 1. Mechanism 57 is formed in a generally "C" shaped cross section or sectioned cylinder in order to allow ease of installation on control lock collar 59 and control column 58.

Obviously, means of sensing control position as disclosed in FIGS. 6A and 6B may be combined with the devices of FIGS. 7A through 7E in order to simplify the simulator.

Although not shown in the drawings, it will be appreciated that sensors may also be mounted in association with other existing controls and switches in the aircraft and appropriately tied in with the computer 1. In this manner, manipulation of the throttle, mixture, trim, brake and other controls may be included in the operation of the simulator system.

It is to be understood that the present invention is not limited to the embodiments described above, but encompasses any and all embodiments within the scope of the following claims.

I claim:

1. A flight simulator apparatus removably installable in and using an actual aircraft not in flight and having movable control members comprising;
   an actual aircraft and aircraft instrument panel, said aircraft being currently non-operative and grounded,
   an aircraft instrument panel overlay containing a plurality of simulated instruments, said simulated instruments capable of mimicking and duplicating the movements and responses of actual aircraft instruments,
   a central computer,
   said simulated instruments of said aircraft instrument panel overlay mountable over the existing actual individual instruments of said actual aircraft instrument panel and receiving output from said central computer,
   said central computer adapted to provided simulated displays of the operating instruments of an actual operating aircraft by means of said instrument panel overlay,
   a plurality of position sensing means mounted to and adjacent said control members of said actual aircraft and electrically connected to said computer, said position sensing means moving with said control members,
   said position sensing means for providing output to said central computer relating to the position of said actual control members,
   an indicator light overlay comprising individual indicator lights positioned over actual indicator lights of said aircraft and electrically connected to said computer,
   said indicator light overlay receiving signals from said central computer to simulate the appropriate activation of indicator lights in an actual operating aircraft, and
   an aircraft switch overlay mounted adjacent existing switches in said actual aircraft and including secondary switches, which open or close upon movement of said existing switches in said actual aircraft, providing positions information of the existing switches to said central computer.

2. The apparatus of claim 1 including,
   a plurality of shiftable jacks supporting said actual aircraft,
   said jacks actuated by signals from said central computer to provide movement of said actual aircraft to simulate inflight movement.

3. The apparatus of claim 1 wherein,
   said simulated instruments in said panel overlay include no less than the basic flight instruments.

4. The apparatus of claim 1 wherein,
   said sensing means includes at least one sensor on the aircraft control wheel.

5. The apparatus of claim 1 including,
   pressure feedback means mounted upon an aircraft control wheel and electrically connected to said computer for producing realistic pressure feedback for said control wheel.

6. The apparatus of claim 5 wherein,
   said control members include pressure feedback means mounted upon the control wheel of said aircraft,
   said pressure feedback means receiving output from said central computer,
   visual displays temporarily installed upon the windshield and/or windows of said actual aircraft,
   said visual displays receiving output from said central computer so as to simulate the field of view perceived in actual flight, and audio simulation means comprising,
   audio signals transmitted from said central computer to a cockpit speaker and/or flight crew headphones with the audio signals dependent upon the simulated aircraft configuration as perceived by said central computer.

7. The apparatus of claim 5 including,
   visual displays temporarily installed upon the windshield and/or windows of said actual aircraft,
   said visual displays receiving output from said central computer so as to simulate the field of view perceived in actual flight, and
   audio simulation means comprising,
   audio signals transmitted from said central computer to a cockpit speaker and/or flight crew headphones.

8. The apparatus of claim 1 including,
   pressure feedback means attached to flight control members of said actual aircraft and electrically connected to said computer for producing realistic pressure feedback for said flight control members.

9. The apparatus of claim 8 including,
   visual displays temporarily installed upon the windshield and/or side windows of said actual aircraft,
   said visual displays receiving output from said central computer so as to simulate the field of view perceived in actual flight, and
   audio simulation means comprising,
   audio signals transmitted from said central computer to a cockpit speaker and/or flight crew headphones.

10. The apparatus of claim 1 including,
    visual displays temporarily installed upon the windshield and/or windows of the aircraft,
    said visual displays receiving information from said central computer so as to simulate the field of view perceived in actual flight.

11. The apparatus of claim 10 including,
    audio simulation means comprising,
    audio signals transmitted from said central computer to a cockpit speaker and/or flight crew headphones.

12. The apparatus of claim 1 including,
    audio simulation means comprising,
    audio simulation signals transmitted from said central computer to a cockpit speaker and/or flight crew headphones, wherein said audio simulation signals are dependent upon the simulated aircraft configuration as perceived by said central computer.

13. The apparatus of claim 1 including,
pressure feedback means attached to the flight control members of said actual aircraft for producing realistic pressure feedback for said control members,
said pressure feedback means receiving output from said central computer, visual displays temporarily installed upon the windshield and/or windows of said actual aircraft,
said visual displays receiving output from said central computer so as to simulate the field of view perceived in actual flight, and
audio simulation means comprising,
audio signals transmitted from said central computer to a cockpit speaker and/or flight crew headphones with the audio signals dependent upon the simulated aircraft configuration as perceived by said central computer.

* * * * *